April 7, 1936.  W. H. D. BROUSE  2,036,564

TRAY RELEASE MECHANISM FOR REFRIGERATOR FREEZING UNITS

Filed Sept. 21, 1933

Inventor.
William H. D. Brouse.

Patented Apr. 7, 1936

2,036,564

UNITED STATES PATENT OFFICE 2,036,564

TRAY RELEASE MECHANISM FOR REFRIGERATOR FREEZING UNITS

William H. D. Brouse, Toronto, Ontario, Canada

Application September 21, 1933, Serial No. 690,438

6 Claims. (Cl. 62—108.5)

The principal object of this invention is to obviate the inconvenience of freeing the ice trays in a refrigerator from the freezing thereof to the bottom of the freezing compartment in which they are placed and to provide a means which will automatically effect their immediate release by a very simple operating device which may be connected with the door of the freezing compartment.

The principal feature of the invention resides in the novel construction and arrangement of a simple device whereby a cam-shaped member is moved to effect a wedging action between the bottom of the tray and the bottom of the freezing compartment on which the tray rests to effectively separate same.

In the drawing, Figure 1 is a perspective view of the front of a typical freezing unit with the door open and showing my invention applied thereto.

Figure 4 is a perspective assembly view illustrating a preferred manner of pivotally mounting the release member.

Figure 1:
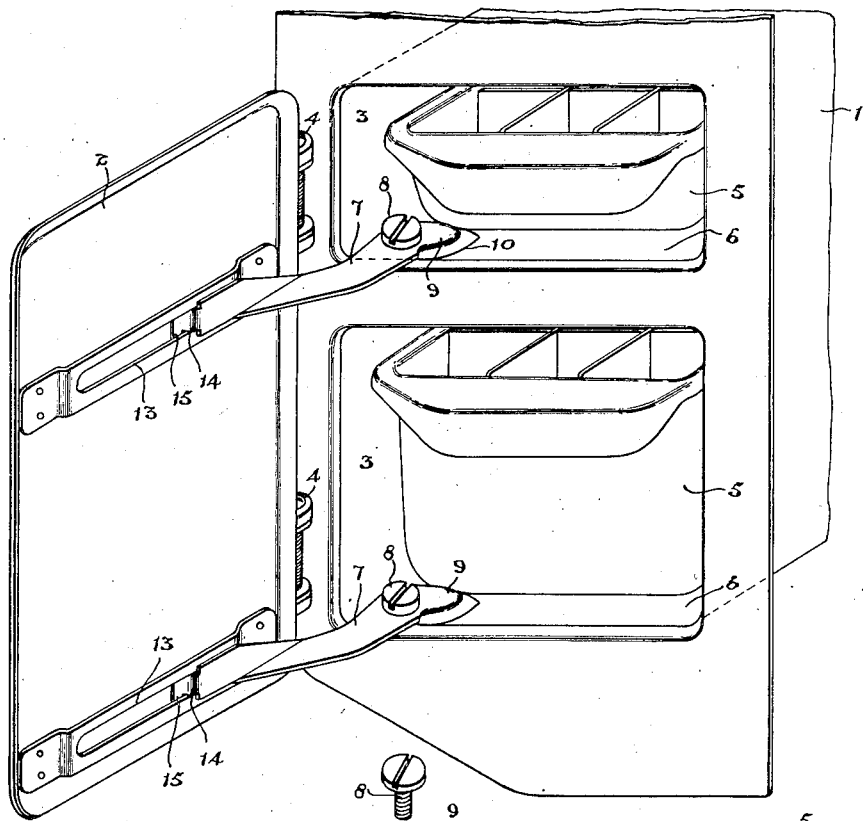
Figure 3:
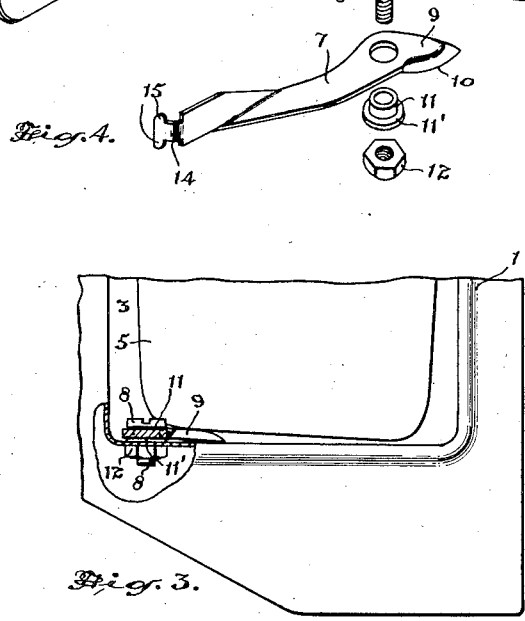
Figure 3 is a fragmentary part sectional elevation of the lower portion of the freezing unit showing the tray raised by the release member.

Considerable difficulty has been experienced in the removal of the trays from the freezing compartments of the domestic type of refrigerator due to the freezing of the tray to the bottom of the compartment and frequently harsh methods are adopted in an endeavour to release the "frozen tray" resulting in damage to the tray or to the freezing unit.

The present invention proposes to overcome this difficulty in a very simple and efficient manner.

In accordance with the preferred form of invention illustrated in the drawing the freezing unit 1 may be of any conventional form and is here shown provided with a door 2 for closing the entrance to the freezing compartment 3, the door being here shown as mounted on vertical hinge pins 4 disposed at one side. Trays 5 for holding water or desserts to be frozen are removably received in the compartments 3 and are adapted to rest with their bottom surface in flat surface contact with the bottom floor 6 of the compartments.

It frequently happens that in placing the filled trays in the compartments water is spilt over the edge and runs downwardly into the bottom 6 of the compartment with the result that during the subsequent freezing operation the trays are frozen solidly to the bottom of the compartment, rendering their removal extremely difficult.

In order to overcome this difficulty I propose to arrange a lever member in connection with each freezing compartment, the lever 7 being here shown pivotally mounted on a vertical pivot screw 8 positioned adjacent the entrance to the freezer compartment at a point adjacent the hinge mounting of the door 2.

As shown the levers 7 are preferably provided with an angularly disposed extension 9 of beveled or wedge-like form, such extension being tapered downwardly to a substantial knife-edge 10 and is adapted on the swinging of the lever on its pivot to swing in under the adjacent bottom corner of the tray with a wedge-like action to effect the prying or lifting of the tray from its flat frozen surface contact with the bottom of the compartment.

As shown in Figure 4 a bearing bushing 11 preferably encircles the pivot screw 8 to form an effective bearing for the lever, and such pivot screw preferably extends downwardly through the bottom wall of the freezing compartment where it is secured, with the head in pressure contact with the upper edge of the bushing, by means of the nut 12. The lever is thus effectively held against any thrusts to which it is subject while being at the same time quite free to rotate between the lower collar portion 11' and the underside of the pivot screw head.

It is preferable to provide for the automatic operation of the lever 7 and according to the present invention I provide guide-ways 13 formed of slotted strips of metal which are secured in a parallel arrangement transversely of the inner side of the door 2. The free ends of the levers 7 are preferably turned angularly upward as shown in the drawing and terminate in lug extensions 14 which are adapted to be inserted in the guide slots of the members 13, such lug extensions being preferably of a lesser width than the end portion of the lever from which they extend and having projecting lugs 15 which co-operate with the inner side of the guide members 13 to maintain the levers in guiding contact with such members. The levers are thus operatively associated with the closure floor for the freezing compartments so that they will be automatically swung with a positive and powerful movement on the opening of the door so that the wedge-like portion of the levers will be swung as indicated in Figure 2 to effectively release the tray from its connection with the bottom of the compartment, whereupon the tray may be readily removed from the compartment.

The presence of the collar portion 11' serves to support the lever and its extension with their major under surface free of contact with the bottom of the compartment to ensure against the undesired possibility of the lever becoming frozen solidly to the compartment bottom, throwing an unnecessary strain on the mechanism.

Figure 2:
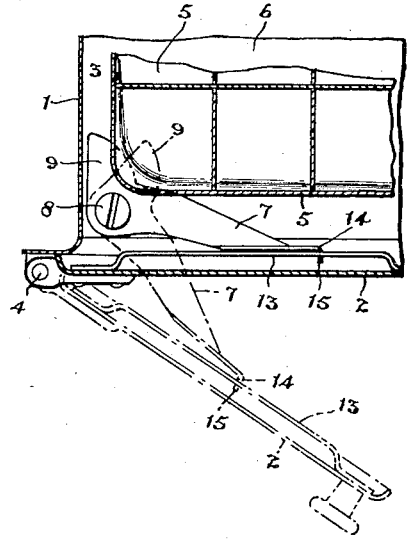
Figure 2 is a sectional plan view of the corner portion of the freezing unit showing the release member in normal position in full lines out of contact with the tray member and with the door closed and illustrating in dotted lines the position to which the release member is moved under the tray on the opening of the door.

On the closing of the door after the trays have been placed in position the wedge-like extension 9 of the lever will simply pass in under the tray corner and will be swung therebeyond quite clear of contact with the tray bottom as indicated in Figure 2 so that the trays will rest in flat heat exchange contact with the bottom or floor of the compartment, and it may be found desirable to arrange the cam levers 7 independent of any other source of operation. When thus arranged it is merely necessary for the person desiring to remove a tray to pull directly on the lever and free the tray.

It will be readily appreciated that various structural alterations may be resorted to in carrying the present invention into effect without departing from the essential spirit of the invention.

What I claim as my invention is:—

1. The combination with a freezing compartment having a tray resting on the bottom formed with upwardly rounded corners, of means normally out of contact with said tray and operable in a substantially horizontal plane with a slow powerful swinging motion in under one of said rounded corners and presenting a wedging action between the compartment bottom and the said rounded corner to exert a corner lift on the tray and free the same from frozen connection with the compartment bottom.

2. The combination with a freezing compartment having a tray removably arranged therein and a door closing the entrance to said compartment, of pivotal means operatively connected with said door and actuated under said tray in a horizontal plane with a slow powerful swinging movement continuously during the movement of the door from a closed to a fully open position to loosen the tray from the compartment bottom with the minimum of effort and strain on the door and operating connection.

3. The combination with a freezing compartment having a freezing tray arranged therein and a door hinged at one side of the compartment for closing the entrance thereto, of a lever pivotally mounted on a vertical pivot adjacent the entrance to said compartment and having a portion extending beyond the pivot and engageable with the underside of the tray in pressure contact to release the same, and guide means extending transversely of the door and operatively connecting the outer end of said lever with the hinged door.

4. The combination with the freezing compartment having a tray removably mounted therein and a pivotal closure door for the entrance to said compartment, of a lever having its inner end mounted on a vertical pivot disposed at the entrance to the compartment adjacent the pivotal mounting of the door, said lever having a wedge-like projection disposed in substantial right angular relation to the lever and adapted when the latter is swung on its pivot to extend in under the adjacent corner of the tray to pry the same loose from its frozen connection with the compartment bottom, and means operatively connecting the outer free end of said lever with said closure door.

5. Means as claimed in claim 4 in which the pivotal mounting of said lever comprises a pivot screw extending downwardly through the compartment bottom and encircled by a collar sleeve on which the lever is rotatable.

6. Means as claimed in claim 3 in which the lever and its tray-engaging extension are mounted to swing substantially parallel to the compartment bottom and with the major under surface thereof spaced slightly above the compartment bottom to obviate the tendency to freeze thereto.

WILLIAM H. D. BROUSE.